(12) United States Patent
Hwang

(10) Patent No.: US 9,225,861 B2
(45) Date of Patent: Dec. 29, 2015

(54) IMAGE FORMING APPARATUS, METHOD OF INSTALLING OSGI-BASED SERVICE, METHOD OF PROVIDING OSGI-BASED SERVICE, AND COMPUTER-READABLE RECORDING MEDIUM

(75) Inventor: Ki-young Hwang, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 189 days.

(21) Appl. No.: 13/242,781

(22) Filed: Sep. 23, 2011

(65) Prior Publication Data

US 2012/0260197 A1    Oct. 11, 2012

(30) Foreign Application Priority Data

Apr. 11, 2011  (KR) .................. 10-2011-0033488

(51) Int. Cl.
*G06F 3/00* (2006.01)
*H04N 1/00* (2006.01)
*G06F 9/44* (2006.01)
*H04N 1/32* (2006.01)

(52) U.S. Cl.
CPC .......... *H04N 1/00413* (2013.01); *G06F 9/4443* (2013.01); *H04N 1/00416* (2013.01); *H04N 1/00427* (2013.01); *H04N 1/00432* (2013.01); *H04N 1/00472* (2013.01); *H04N 1/00474* (2013.01); *H04N 1/00501* (2013.01); *H04N 1/00941* (2013.01); *H04N 1/00973* (2013.01); *H04N 1/32561* (2013.01)

(58) Field of Classification Search
CPC ............ G06F 9/44526; G06F 17/2247; G06F 17/30896; G06F 9/4443; H04N 1/00413
USPC .......................... 715/234, 243, 254, 255, 700
See application file for complete search history.

(56) References Cited

U.S. PATENT DOCUMENTS

| | | | |
|---|---|---|---|
| 7,895,296 B1 | 2/2011 | Dayan | |
| 2003/0184584 A1 | 10/2003 | Vachuska et al. | |
| 2006/0233126 A1 | 10/2006 | Herenyi et al. | |
| 2007/0055936 A1 | 3/2007 | Dhanjal et al. | |
| 2008/0034314 A1* | 2/2008 | Louch et al. .................. 715/778 |
| 2008/0141148 A1 | 6/2008 | Ogita | |
| 2009/0144711 A1 | 6/2009 | Chang | |

(Continued)

FOREIGN PATENT DOCUMENTS

DE   102006046960   4/2008
EP       1944687   7/2008

(Continued)

OTHER PUBLICATIONS

Extended European Search Report dated Aug. 1, 2012 issued in EP Application No. 11186742.0.

(Continued)

*Primary Examiner* — Kyle Stork
(74) *Attorney, Agent, or Firm* — Staas & Halsey LLP

(57) ABSTRACT

An image forming apparatus having an open services gateway initiative (OSGi)-based service is provided. The image forming apparatus may include a user interface (UI) unit to receive a service execution command for a first bundle to provide at least one service, and a control unit which controls the UI unit to display a UI of a second bundle to provide at least one service, the second bundle having UI expansion information for the first bundle in one region of a UI window corresponding to the first bundle.

27 Claims, 13 Drawing Sheets

(56) References Cited

U.S. PATENT DOCUMENTS

2010/0095296 A1    4/2010   Su
2010/0228693 A1*   9/2010   Dawson et al. ................ 706/12
2010/0332687 A1   12/2010   Jung et al.

FOREIGN PATENT DOCUMENTS

| | | |
|---|---|---|
| EP | 2099209 | 9/2009 |
| GB | 2354851 | 4/2001 |
| JP | 2009-223576 | 10/2009 |
| WO | 2006/122024 | 11/2006 |

OTHER PUBLICATIONS

International Search Report and Written Opinion issued on Nov. 29, 2012 in International Application No. PCT/KR2012/002723.

European Office Communication dated May 29, 2015 in European Patent Application No. 11186742.0.

* cited by examiner

FIG. 11

```
<!-- Toolbox for File Storage -->
<xoa-s-remoteui:uiEntry>
  <xoa-s-remoteui:menu>
    <xoa-s-remoteui:id>fileStorageUIExtension</xoa-s-remoteui:id>
    <xoa-s-remoteui:extensionPoint>fileStorageMyfunction</xoa-s-remoteui:extensionPoint>
    <xoa-s-remoteui:rank>2</xoa-s-remoteui:rank>
    <xoa-s-remoteui:uiClassName>net.xoaframework.ui.remote.view.ext.IResourceToolBoxMenu</xoa-s-remoteui:uiClassName>
    <xoa-s-remoteui:displayNameKey>File_Storage_detail.resource.toolbox.myfunction.displayname.key</xoa-s-remoteui:displayNameKey>
    <xoa-s-remoteui:resourceMenuRule>3</xoa-s-remoteui:resourceMenuRule>
    <xoa-s-remoteui:toolTipKey>filestorage.detail.resource.toolBox.myfunction.tooltip.key</xoa-s-remoteui:toolTipKey>
    <xoa-s-remoteui:imageUri>/filestorage.cm.presentation/static-client/assets/icons/toolbox/myfunction_plan.png</xoa-s-remoteui:imageUri>
  </xoa-s-remoteui:menu>

<xoa-s-remoteui:perspective>
    <xoa-s-remoteui:id>fileStorageUIExtensionPerspective</xoa-s-remoteui:id>
    <xoa-s-remoteui:extensionPoint>fileStorageMyfunctionSub</xoa-s-remoteui:extensionPoint>
    <xoa-s-remoteui:rank>2</xoa-s-remoteui:rank>
    <xoa-s-remoteui:uiClassName>net.xoaframework.ui.remote.view.ext.IResourceToolBox.MenuSuvfunction</xoa-s-remoteui:uiClassName>
    <xoa-s-remoteui:resourceClassName>filestorage.pre.ToolBox.ToolBox.perspectie.pre.ToolBox.MenuSuvfunction</xoa-s-remoteui:resourceClassName>
    <xoa-s-remoteui:displayNameKey>cost.detail.resource.toolBox.perspectie....resource.toolBox.perspectie.displayname.key</xoa-s-remoteui:displayNameKey>
    <xoa-s-remoteui:imageUri>/filestorage.cm.presentation/static-client/assets/icons/toolbox/myfunction_plan.png</xoa-s-remoteui:imageUri>
    <xoa-s-remoteui:layout>
      <xoa-s-remoteui:basicLayout>
        <xoa-s-remoteui:mainView>
          <xoa-s-remoteui:uri>/filestorage.cm.presentation/client/FileStorage_MyFunction.swf</xoa-s-remoteui:uri>
          <xoa-s-remoteui:dimension>
            <xoa-s-remoteui:length>0</xoa-s-remoteui:length>
            <xoa-s-remoteui:width>90</xoa-s-remoteui:width>
          </xoa-s-remoteui:dimension>
        </xoa-s-remoteui:mainView>
      </xoa-s-remoteui:basicLayout>
    </xoa-s-remoteui:layout>
  </xoa-s-remoteui:perspective>
</xoa-s-remoteui:uiEntry>
<!-- Toolbox for File Storage -->
```

1100, 1110, 1120, 1130

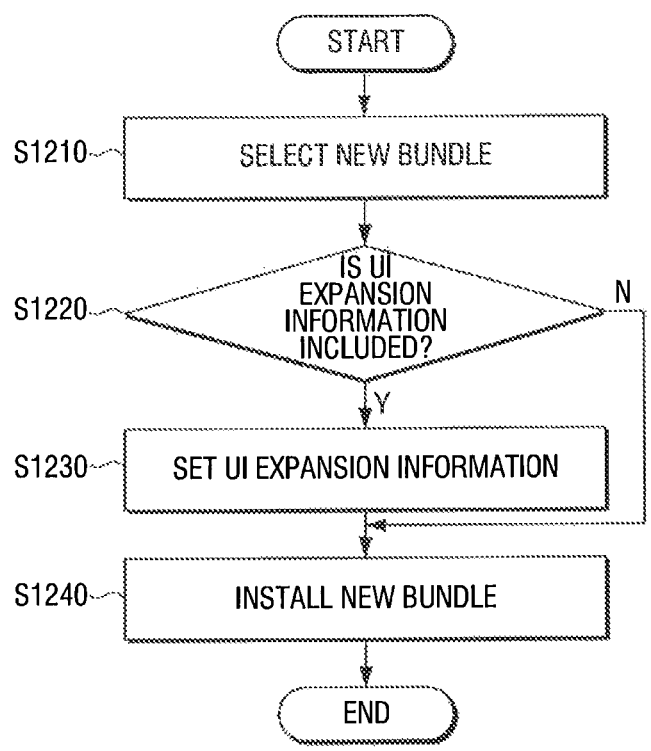

IMAGE FORMING APPARATUS, METHOD OF INSTALLING OSGI-BASED SERVICE, METHOD OF PROVIDING OSGI-BASED SERVICE, AND COMPUTER-READABLE RECORDING MEDIUM

CROSS-REFERENCE TO RELATED APPLICATIONS

This application claims priority under 35 U.S.C. 119(a) from Korean Patent Application No. 10-2011-0033488, filed on Apr. 11, 2011, in the Korean Intellectual Property Office, the disclosure of which is incorporated herein by reference in its entirety.

BACKGROUND OF THE INVENTION

1. Field of the Invention

The present general inventive concept relates to an image forming apparatus, a method of installing an open services gateway initiative (OSGi)-based service, a method of providing an OSGi-based service, and a computer-readable recording medium, and more particularly, to an image forming apparatus, a method of installing an OSGi-based service, a method of providing an OSGi-based service, and a computer-readable recording medium, which can perform function expansion for bundles preinstalled in an OSGi framework.

2. Description of the Related Art

With the rapid progress of digital technology and Internet penetration, digital home technology provides services so as to help general users in everyday life. However, the digital home technology's aim to provide various services by utilizing external communication and home networking so as to share a high speed Internet, files, and peripheral apparatuses has been limited.

There is an open services gateway initiative (OSGi) service platform made to be operated on the basis of a JAVA Virtual Machine as a typical service platform of the digital home technology. The OSGi provides basic service such as hypertext transport protocol (HTTP), service management, and log service on a framework. Service providers can provide service by deploying their own services in bundle form on the OSGi framework. In particular, since the OSGi supports the conventional home network technology such as universal plug and play (UPnP), Java intelligent network infra-structure (Jini), home audio video interoperability (HAVi), the OSGi is applicable to various environments such as a television (TV) settop box, a cable modem, an alarm system, an energy control system.

It is possible to export or import the functions of one bundle to another bundle used in the OSGi, and use the bundles. Thus, it is possible to make an expansion between bundles and obtain reusability and recombination of functions based on flexibility between the bundles.

However, in the related art, bundles communicate between one another by reusing an interface between the bundles through expansion and communication of functions.

SUMMARY OF THE INVENTION

The present general inventive concept provides expanding functions between communicating bundles in an OSGi service platform by expansion of a user interface (UI). The present general inventive concept also provides function expansion and extensibility of a UI window by dynamically changing the UI window when at least one of the bundles operates. That is, exemplary embodiments of the present general inventive concept provide expansion, correction, and change of functions in the UI. One or more exemplary embodiments may overcome the above disadvantages and other disadvantages not described above. However, it is understood that one or more exemplary embodiments are not required to overcome the disadvantages described above, and may not overcome any of the problems described above.

Additional features and utilities of the present general inventive concept will be set forth in part in the description which follows and, in part, will be obvious from the description, or may be learned by practice of the general inventive concept.

Exemplary embodiments of the present general inventive concept may provide an image forming apparatus, a method of installing open services gateway initiative (OSGi)-based service, a method of providing OSGi-based service, and a computer-readable recording medium, which perform function expansion for bundles previously installed on an OSGi framework.

Exemplary embodiments of the present general inventive concept may also provide an image forming apparatus. The image forming apparatus may include a user interface (UI) unit to receive a service execution command for a first bundle to provide at least one service, and a control unit to control the UI unit to display a UI of a second bundle to provide at least one service, the second bundle having UI expansion information for the first bundle in one region of a UI window corresponding to the first bundle.

The control unit may, when the UI of the second bundle is selected, control a service engine of the second bundle according to information included in the UI window corresponding to the first bundle and control the UI unit to display an execution result of the service engine of the second bundle.

The one region of the UI window corresponding to the first bundle may be an extension point which is preinstalled among a plurality of regions of the UI window displayed to provide the at least one service of the first bundle.

The extension point may be at least one of a Toolbox region, a Derailed View Tap region, and a Menu region.

The UI expansion information may include at least one type information for a UI to receive an execution command for the at least one service provided by the second bundle, expansion position information in which the UI is to be displayed among the extension point of the first bundle, and action information to display an execution result of the at least one service provided by the second bundle.

The UI expansion information may be subscribed in an extensible markup language (XML).

The control unit may control the UI unit to expand and display a UI region corresponding to the second bundles in a region corresponding to position information of the UI window, while displaying the UI window for the first bundles.

The UI unit may display the execution result as a pop-up window type.

Exemplary embodiments of the present general inventive concept may also provide an image forming apparatus. The image forming apparatus may include a UI unit to display an OSGi-based service, and a control unit to control the UI unit to display a UI window including a first UI which displays a first service provided by a first bundle, a second UI which displays a second service provided by a second bundle installed after the first bundle is installed, and an expansion UI which displays the second service provided by the second bundle on the first UI after the second bundle is installed.

Exemplary embodiments of the present general inventive concept may also provide a method of installing OSGi-based service. The method may include selecting new bundle to provide at least one service to be installed on OSGi framework of the OSGi apparatus, determining whether the new bundle includes UI expansion information for at least one bundle preinstalled on the OSGi framework, when the new bundle includes the UI expansion information, setting the UI expansion information to the OSGi framework so as to display a UI according to the UI expansion information in one region of a UI window corresponding to the preinstalled bundle when at least one service corresponding to the preinstalled bundle is executed, and installing the new bundle in the OSGi framework.

In the preinstalled bundle, a UI extension point may be set among a plurality of regions of the UI window displayed when the service is executed.

The extension point may be at least one of a Toolbox region, a Derailed View Tap region, and a Menu region.

The UI expansion information may include at least one of a type information for a UI to receive an execution command for services provided by the new bundle, expansion position information in which the UI is to be displayed among the extension point of the preinstalled bundles, and action information to display an execution result of the at least one service provided by the new bundle.

The UI expansion information may be subscribed in an extensible markup language (XML).

The new bundle may provide the at least one service using information included in the UI window provided by the preinstalled bundle.

Exemplary embodiments of the present general inventive concept may also provide a method of providing OSGi-based service with an OSGi-based apparatus. The method may include receiving a service execution command for a first bundle that provides at least one service with the OSGi-based apparatus, and displaying a UI of a second bundle that provides at least one service, the second having UI expansion information for the first bundle in one region of a UI window corresponding to the first bundle with the OSGi-based apparatus.

The method may further include, selecting the UI of the second bundle, controlling a service engine of the second bundle with the OSGi-based apparatus according to information included the UI window corresponding to the first bundle, and displaying an execution result of the service engine of the second bundle in the UI window corresponding to the first bundle.

The one region of the UI window corresponding to the first bundle may be an extension point preinstalled among a plurality of regions of the UI window displayed when the at least one service of the first bundle is provided.

The extension point may be at least one of a Toolbox region, a Derailed View Tap region, and a Menu region.

The UI expansion information may include at least one type information for a UI to receive an execution command for services provided by a new bundle, expansion position information in which the UI is to be displayed among the extension point of a preinstalled bundle, and action information to display method of an execution result of services provided by the new bundle.

The UI expansion information may be subscribed in an XML.

The displaying the execution result may include expanding and displaying a UI region corresponding to the second bundle in a region corresponding to position information of the UI window, while displaying the UI window for the first bundle.

The displaying the execution result may include displaying the execution result in a pop-up window type.

Exemplary embodiments of the present general inventive concept may also provide a computer readable recording medium including a program which, when executed by a computer, performs a method of providing an OSGi-based service. The method of providing the OSGi-based service may include receiving a service execution command for a first bundle that provides at least one service, determining whether a second bundle having UI expansion information for the first bundle is present, and displaying a UI according to the UI expansion information in one region of a UI window corresponding to the first bundle.

The method may further include selecting a UI of the second bundle, controlling a service engine of the second bundle based on information included the UI window corresponding to the first bundle, and displaying an execution result of the service engine of the second bundle in the UI window corresponding to the first bundle.

Exemplary embodiments of the present general inventive concept may also provide a method of expanding a user interface (UI) of an open services gateway initiative (OSGi)-based service apparatus including an OSGi framework, the method including receiving a bundle to provide at least one service, the bundle including UI expansion information, setting the UI expansion information to the OSGi framework of the OSGi-based service apparatus, and displaying the UI of the OSGi-based service apparatus including the expansion information when a service execution command is received by the OSGi-based service apparatus for the at least one service provided by the bundle including the UI expansion information.

The method may also include displaying an execution result the UI of the OSGi-based service apparatus of the received service execution command.

The setting the UI expansion information of the method may include expanding the UI of the OSGi-based service apparatus at a predetermined extension point in at least one region of the UI to include the at least one service of the received bundle.

The method may include where the predetermined extension point is one of a plurality of regions of the UI.

The method may include where the UI expansion information includes at least one of type information for a UI to receive the service execution command, expansion position information in which the UI is to be displayed among the extension point, and action information to display an execution result of the at least one service provided by the bundle.

Exemplary embodiments of the present general inventive concept may also provide an open services gateway initiative (OSGi)-based service apparatus including an OSGi framework and a user interface (UI) including a communication interface to receive a bundle to provide at least one service, the bundle including UI expansion information, a controller to set the UI expansion information to the OSGi framework of the OSGi-based service apparatus, and a user interface unit to display the UI including the expansion information when a service execution command is received for the at least one service provided by the bundle including the UI expansion information.

The OSGi-based service apparatus may include an image forming unit to form an image according to the received service execution command.

Additional features and utilities of the exemplary embodiments will be set forth in the detailed description, will be obvious from the detailed description, or may be learned by practicing the exemplary embodiments.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 11 is a file format of a bundle having UI expansion information according to exemplary embodiments of the present general inventive concept;

FIG. 12 is a flowchart illustrating a method of installing a service in an OSGi framework according to exemplary embodiments of the present general inventive concept.

DETAILED DESCRIPTION OF THE PREFERRED EMBODIMENTS

Figure 1:
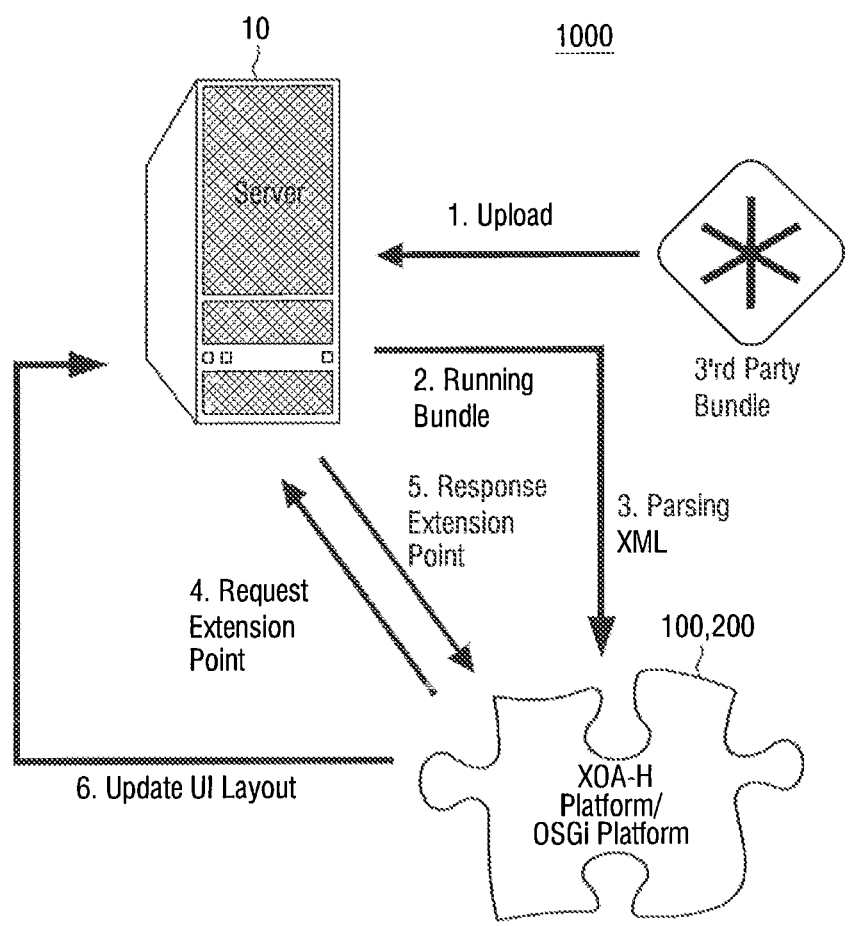
FIG. 1 is a view illustrating an image forming system to provide an OSGi-based service according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating an image forming system 1000 to provide an OSGi-based service according to exemplary embodiments of the present general inventive concept.

Referring to FIG. 1, the image forming system 1000 includes a server 10 and an image forming apparatus 100.

The server 10 is an apparatus which can provide bundles to the image forming apparatus 100 and may be a personal computer (PC), a personal digital assistant (PDA), a tablet computer, a set-top box, a digital media server, a mobile phone, a digital camera, a digital video camera, a point of sale (POS) terminal, or the like in addition to a server.

Here, a bundle is a program in which service providers create to deploy their own new services. Detailed operation of the bundle will be described later with reference to FIG. 3. As illustrated in FIG. 1, a service provider (e.g., a third-party service provider) may upload one or more bundles to the server 10. The server 10 may provide the one or more bundles to the image forming apparatus 100.

The service may include one or more kinds of functions provided by an open services gateway initiative (OSGi)-based apparatus. For example, when the OSGi-based apparatus is an image forming apparatus (e.g., image forming apparatus 100), a plurality of functions provided by the conventional image forming apparatus such as a facsimile, a copying machine, and a printer may correspond to the service. Installing the bundle on the example OSGi-based image forming apparatus may provide new functions and/or services that were not provided by the image forming apparatus prior to the installation of the bundle. For example, when the bundle is installed on the OSGi-based image forming apparatus, a function which transfers a facsimile text into an electronic mail message and/or text document may correspond to the service of the bundle.

The server 10 may transfer a bundle installation command to the image forming apparatus 100 to install the bundle so that the image forming apparatus 100 can support one or more services to be provided by the bundle. The server 10 may transfer a service execution command to the image forming apparatus 100. For example, the server 10 may transfer the service execution command relating to a service provided by a bundle when the bundle is installed on the image forming apparatus 100. When received by the server 10, the service execution command may be executed by the image forming apparatus 100 in connection with one or more bundles to provide at least one service. The server 10 may receive a service execution result corresponding to the service execution command from the image forming apparatus 100. That is, the server 10 can execute the service execution command so that the image forming apparatus 100 executes one or more services provided by the installed bundles, and the service execution result may be provided by the image forming apparatus 100 to the server 10.

The image forming apparatus 100 may receive a bundle from the server 10 and install the bundle on an OSGi framework supported by the image forming apparatus 100. The image forming apparatus 100 may include a copying machine, a scanner, a printer, a facsimile, or may be a multi function peripheral (MFP) which includes at least two functions of copying, scanning, printing, and faxing in one apparatus, or the like.

In the image forming system 1000 illustrated in FIG. 1, a bundle may be uploaded to the server 10. The bundle may include one or more services developed by a third party so that the image forming apparatus 100 can provide and/or have access to additional services.

Figure 2:
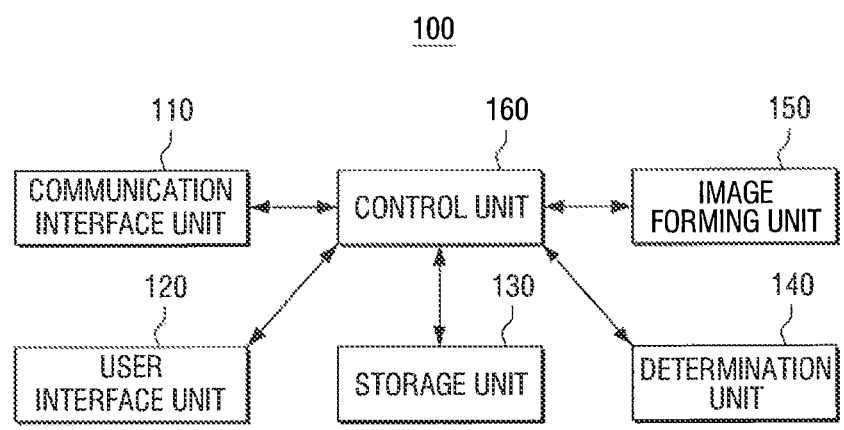
FIG. 2 is a block diagram illustrating a detailed configuration of the image forming apparatus of FIG. 1 according to exemplary embodiments of the present general inventive concept.

FIG. 2 is a block diagram illustrating a detailed configuration of the image forming apparatus 100 of FIG. 1 according to exemplary embodiments of the present general inventive concept.

Referring to FIG. 2, the image forming apparatus 100 may include a communication unit 110, a user interface (UI) unit 120, a storage unit 130, a determination unit 140, an image forming unit 150, and a control unit 160.

The communication interface unit 110 can connect the image forming apparatus 100 to an external device (for example, the server 10) via a local area network (LAN), the Internet, via a wired connection such as a universal serial bus (USB) port, and/or via a wireless communication connection via a wireless module. That is, in exemplary embodiments of the present general inventive concept, the communication interface unit 110 may be a wired and/or wireless interface to communicatively couple the image forming apparatus 100 to a communication network that may include the server 10 or any other wired and/or wireless communication device.

The communication interface 110 may receive a bundle installation command from the server 10. The communication interface 110 may receive a new bundle from the server 10 to be installed on the image forming apparatus 100 in accordance with the received bundle installation command from the server 10. The bundle installation command may be received from the server 10 and input through the UI unit 120 to be described later.

The communication interface unit 110 may receive a service execution command from the server 10 and transfer the received service execution command to the control unit 160. The service execution command may be, for example, a command to execute a service that may be provided in a bundle that is installed in the image forming apparatus 100.

The communication interface unit 110 may transfer the service execution result according to the input service execution command to the server 10. That is, when the service execution command has been executed by the image forming apparatus 100, the communication interface unit 110 can transfer the service execution result to the server 10.

The UI unit 120 may include a plurality of function keys which can set or select one or more functions supported by the image forming apparatus 100 by a user and a display to display information to the user provided by the image forming apparatus 100. The UI unit 120 may be an apparatus that can simultaneously receive input and provide output to a display, such as a touch pad and/or an apparatus with combination of a mouse and/or keypad, and a monitor.

The user may select a new bundle to be installed on an OSGi network, where the image forming apparatus 100 is included in the OSGi network, through a UI window provided by the UI unit 120. The user may select at least one service to be received and input a service execution command through the UI window generated and/or provided by the UI unit 120. For example, the user may select one or more services provided by a bundle that is installed in the image forming apparatus 100 via the UI window. The user may, for example, select one or more services related to at least one of printing, copying, scanning, and faxing via the UI window.

The UI unit 120 may display the UI window including a first UI which displays a first service provided by a first bundle, a second UI which displays a second service provided by a second bundle that is installed after the first bundle is installed, an expansion UI which displays the second service provided by the second bundle on the first UI after the second bundle is installed. That is, the UI unit 120 may display the expansion UI which receives an execution command of the second bundle in an extension point on the first UI provided by the first bundle. In exemplary embodiments of the present general inventive concept, the first bundle and the second bundle may be installed, and the first UI and/or the second UI may be displayed according to the selection of a user to execute a service of at least one of the first and second bundles.

The UI unit 120 may display a service execution result corresponding to the service execution command of a user. That is, a user can select a service to be executed via the UI window, and the execution result may be displayed in the UI window for the user. For example, the user may select a service provided by a bundle related to printing, scanning, copying, and/or faxing, and the execution result may be displayed in the UI window.

The storage unit 130 can store at least one bundle. Specifically, the storage unit 130 may store a bundle received through the communication interface unit 110. That is, the communication interface unit 110 may receive a bundle from the server 10, and may store the bundle in the storage unit 130. The storage unit 130 may be a memory mounted on an inside of the image forming apparatus 100, for example, a read only memory (ROM), a flash memory, a hard disc drive (HDD), and/or solid state drive (SSD). The storage unit 130 may be an external HDD, an external SDD, or a memory card connected to the image forming apparatus 100 such as a flash memory (e.g., magnetic stripe (M/S), extreme digital (xD), secure digital (SD), or the like) or a universal serial bus (USB) memory.

The storage unit 130 may store UI expansion information. Here, the UI expansion information may be information which can expand a UI window provided by the preinstalled bundle (for example, the first bundle) or functions provided the preinstalled bundle (e.g., the first bundle) and may include type information, position information, or action information. The detailed configuration and function of the UI expansion information will be described later with reference to FIG. 11. In exemplary embodiments of the present general inventive concept, the UI expansion information may be provided with one or more bundles that are received from the server 10, or may be provided separately from the bundles from the server 10.

The determination unit 140 of the image forming apparatus 100 may be a processor, a controller, a field programmable gate array, a programmable logic device, and/or an integrated circuit. The determination unit 140 can determine whether or not a new bundle includes UI expansion information for a preinstalled bundle on an OSGi framework. Specifically, the determination unit 140 may check whether an extensible markup language (XML) region as illustrated in FIG. 11 is present in the new bundle corresponding to a bundle installation command received through the communication interface unit 110 or the UI unit 120 and determine whether the UI expansion information is included by performing parsing for the UI expansion information. That is, the determination unit 140 determines whether UI expansion information is received with a bundle by parsing the XML region of the bundle installation command. In exemplary embodiments of the present general inventive concept, when the determination unit 140 determines that no UI expansion information is received with the bundle installation command, the determination unit 140 may request UI expansion information for the bundle to be installed and/or a bundle that is presently installed from the server 10 via the communication interface unit 110.

The image forming unit 150 may be a printing device, a facsimile device, and/or a scanner. The image forming unit 150 can perform a printing job. Specifically, when a service request command of a user is related to printing service, the image forming unit 150 may perform the printing job according to the service request of the user. Although the illustrated example illustrates that the image forming apparatus 100 to perform a printing job, the image forming apparatus may perform a facsimile operation when a service request command is received for a fax service, and may perform a scanning operation when a service request command is received for a scan operation to scan text, and may perform a copying operation.

The control unit 160 can control configurations in the image forming apparatus 100, such as the functions provided by the image forming apparatus 100, and the expansion of the UI. Specifically, when a bundle installation command of a user is received by the image forming apparatus 100, the control unit 160 may control the determination unit 140 to determine whether the UI expansion information is included in the new bundle, and install the new bundle on an OSGi framework in the image forming apparatus 100.

When the UI expansion information is included in the new bundle (hereinafter, second bundle), the control unit 160 may set the UI expansion information to the OSGi framework of the image forming apparatus 100. Specifically, the control unit 160 can parse received information for the UI expansion information to recognize a part in which a UI is to be expanded, and can determine whether or not the recognized UI expansion region is UI-expandable. That is, the control unit may determine whether or not an extension point included in the UI expansion information is set to an expandable region in the preset bundle. When the extension point of the UI expansion information is included in the expandable region, the control unit 160 can set the UI expansion information to an open platform setting to change a UI type of the preinstalled bundle.

By the above-described setting, when a service execution command has been received for the first bundle, the OSGi framework may generate a UI corresponding to the UI expansion information together with the UI expansion information to be displayed in one region of the UI window provided by the first bundle when the service for the first bundle is executed. That is, the UI expansion for the preinstalled bundle (the first bundle) can be performed using the UI expansion information.

The control unit 160 may provide and/or control the image forming apparatus 100 to provide at least one service corresponding to the installed bundle. Specifically, when a service starting command corresponding to the first bundle installed in the OSGi framework, the control unit 160 may determine whether or not the second bundle having the UI expansion information for the first bundle is present. If the second bundle having the UI expansion information for the first bundle is not present, the control unit 160 may control the UI unit 120 to display the UI window provided by the first bundle or may control the communication interface unit 110 to display the UI window provided by the first bundle on the server 10.

If the second bundle that includes the UI expansion information for the first bundle is present, the control unit 160 may control the UI unit 120 to display a UI according to the UI expansion information in one region of the UI window provided by the first bundle, or the communication interface unit 110 to display a UI window to which the UI according to the UI expansion information is displayed in the one region of the UI window provided by the first bundle on the server 10.

When a user selects the UI according to the UI expansion information, the control unit 160 may control and/or drive a service engine (e.g., at least one of the service engines of the bundles 165-1, 165-2, and/or 165-3) of a new bundle (e.g., the second bundle) based on information included in the UI window corresponding to the preinstalled bundle (e.g., the first bundle) and control the UI unit 120 to display an execution result of the service engine on the UI window displayed by the UI unit 120 corresponding to the preinstalled bundle (e.g., the first bundle) or the communication interface unit 110 to transmit the execution result of the service engine to the server 10. The service engine of a bundle (e.g., the first bundle, the second bundle, and/or the new bundle) may provide one or more services to a user when the bundle is installed on the image forming device 100 and the one or more services are selected by a user via the UI. The execution result of the service engine may be displayed in a pop-up window type on the UI window provided by the first bundle. The execution result may be an outcome of a service selected by the user. For example, the execution result may be an outcome of a service related to a printing operation, a scanning operation, a fax operation, or a copy operation. The execution result may be, for example, an outcome of text and/or image processing by a selected service performed by the bundle installed on the image forming apparatus 100.

The image forming apparatus 100 according to exemplary embodiments of the present general inventive concept can install the bundle having the UI expansion information in the OSGi framework so that the UI for the preinstalled bundle can be expanded (e.g., so as to include one or more new services and/or functions). Function expansion can be performed through the UI expansion. That is, the UI for the preinstalled bundle can be changed to include selections for one or more services added by the installed bundle.

Figure 2A:
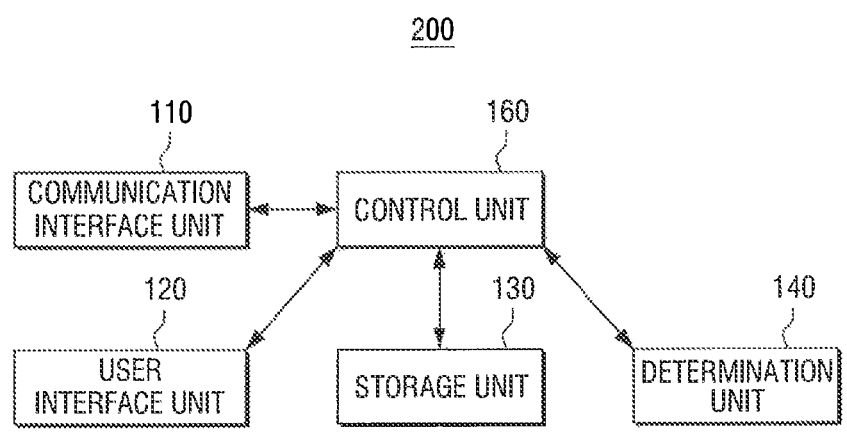
FIG. 2A illustrates a block diagram of a home media apparatus according to exemplary embodiments of the present general inventive concept.

Alternatively, as illustrated in FIG. 2A, a home media apparatus 200 may include the above-described communication interface unit 110, the user interface unit 120, the storage unit 130, and the determination unit 140. The home media apparatus 200 may provide video, images, and/or audio to a user. The video, images, and/or audio may be selectable by a user via a user interface of the home media apparatus 200. As described throughout in connection with the image forming apparatus 100, the UI of the home media apparatus 200 may be similarly expanded to provide one or more new services when one or more new bundles as installed on the home media apparatus 200. Bundles may be developed by third-party service providers (e.g., television providers, Internet providers, audio providers, and/or any media providers) to expand the video, image, and/or audio services provided via the home media apparatus 200 and its interface.

Figure 3:
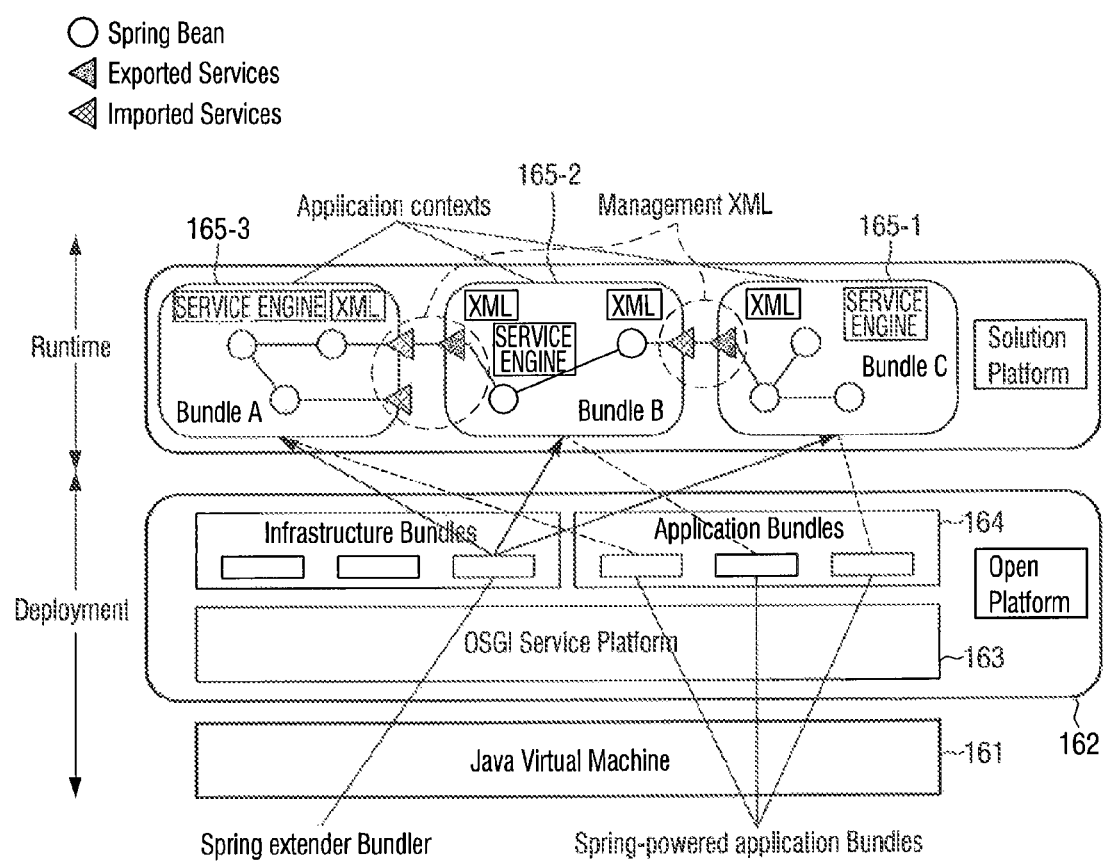
FIGS. 3 to 5 are views illustrating function expansion of a bundle in an OSGi framework according to exemplary embodiments of the present general inventive concept.
Figure 4:
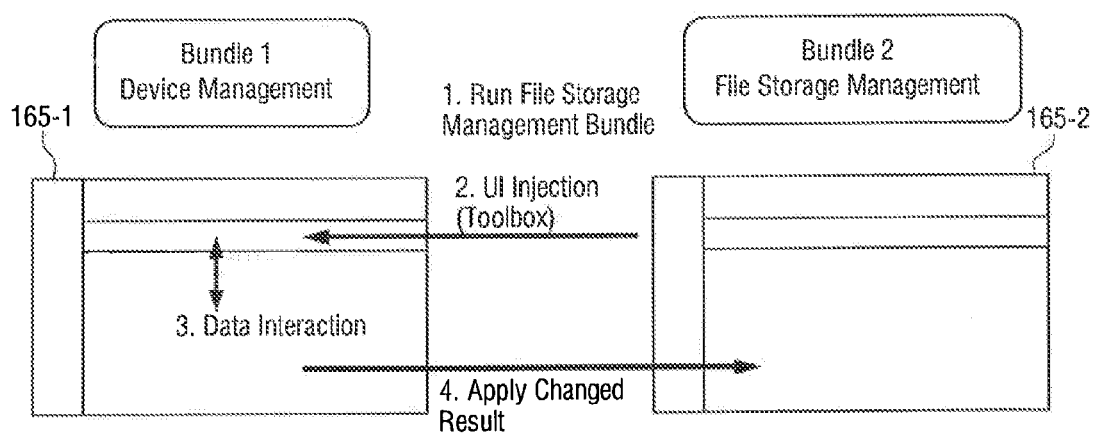
Figure 5:
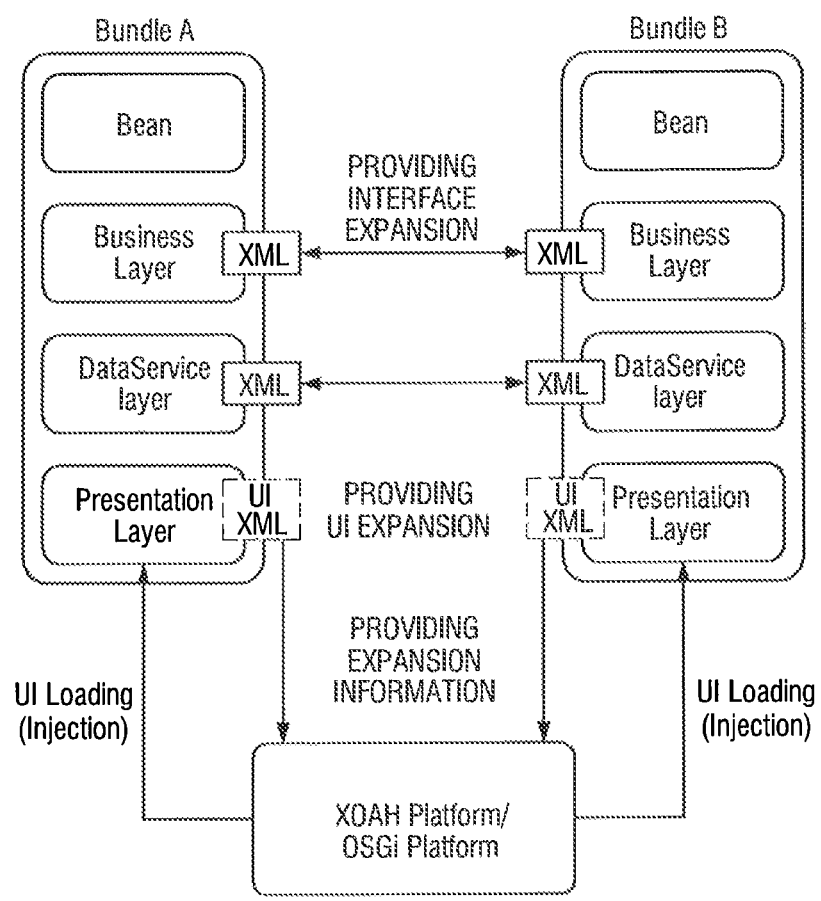

FIGS. 3 to 5 are views illustrating function expansion of a bundle in an OSGi framework according to exemplary embodiments of the present general inventive concept.

Specifically, FIG. 3 illustrates a server-centric extensibility of a main architecture that a server platform may have in an OSGi framework. That is, one or more services provided by a server to a client and/or user in an OSGi framework may be increased, expanded, and/or altered so as to add and/or remove services. In exemplary embodiments of the present general inventive concept, the image forming apparatus 100 where bundles may be installed to provide one or more services to a user may provide extensible services and/or UI.

Referring to FIG. 3, the control unit 160 can include a Java Virtual Machine 161 and an OSGi open platform 162.

The OSGi open platform 162 operates according to the Java Virtual Machine 161 and includes an OSGi service platform 163 and a plurality of bundles 164. The OSGi service platform 163 may manage service requests by a user for one or more services to be provided by one or more bundles installed on the image forming apparatus 100. The plurality of bundles 164 may include infrastructure bundles and/or application bundles as illustrated in FIG. 3, and may include any other suitable bundles to provide services related to, for example, printing, scanning, faxing, and copying operations, as well as text and image processing operations. The infrastructure bundles of the plurality of bundles 164 may provide, for example, OSGi services, such as communication between OSGi devices. The application bundles of the plurality of bundles 164 may provide services related to, for example, printing, scanning, faxing, and copying operations, as well as text and image processing operations.

The OSGi service platform 163 may provide at least one basic service such as hypertext transport protocol (HTTP), service management, or log service, and may provide service that is expanded through the bundles 164 installed in the OSGi service platform 163.

The connection of bundles 165-1, 165-2, and 165-3 at runtime (e.g., upon execution of the bundles by the server 10 and/or the image forming apparatus 100) at a top of the OSGi open platform (or the OSGi service platform) can be defined based on an XML text. That is, XML may be used to define the import and export of services among the bundles (e.g., the connection of bundles 165-1, 165-2, 165-3). A solution platform may include the connection of bundles 165-1, 165-2, and 165-3 to provide an application and/or services to a user. Developers can create and expand bundles based on a basic software development kit (SDK). Developers may expand and develop functions of the bundles through cross-reference between the bundles using an open interface of the bundle. For example, bundles that are cross-referenced may operate so as to perform image processing operations. That is, bundles may be cross-linked so as to provide an application and/or service. The cross-reference information can be described in an XML and the bundles are connected the XML. The management of the applications and/or services of the cross-referenced bundles may be managed by management information described in an XML. At runtime, instances of the infrastructure bundles and the application bundles may be included in a solution platform (e.g., including the connection bundles 165-1, 165-2, and 165-3) to provide applications and/or services.

Although the expansion and reuse of at least one function, application, and/or service can be defined through the cross-reference of the bundles as described above in the related art, the exemplary embodiments of the present general inventive concept provide expansion, correction, and change of functions in the UI.

Specifically, an extension point for the first bundle (the preinstalled bundle) can be designated, a UI expandable region (that is, an expansion position) among the UI extension point of the first bundle, a UI type displayed in the expansion position, and service to be provided by the second bundle can be set to the second bundle (the new bundle) so that the UI for the installed bundle (the first bundle) can be expanded. The UI expansion operation will be described in detail with reference to FIG. 4.

FIG. 4 is a view illustrating an operation between a bundle having the UI expansion information and the preinstalled bundle according to exemplary embodiments of the present general inventive concept.

Referring to FIG. 4, a user may add a new function of the bundle as to expand its own web program (preinstalled bundle) to a desired function in a plug-and-play format.

Specifically, while the first bundle 165-1 operates, the user may add a new second bundle 165-2 to expand a function (as illustrated in FIG. 4 as "1. Run File Management Bundle"). Here, the first bundle 165-1 can be a bundle to provide a service which can manage connected apparatuses (e.g., a device management bundle) and the second bundle 165-2 can be a bundle to provide a service which can manage a file storage state (e.g., a file storage management bundle).

The second bundle may be a bundle which can add a UI in a desired UI extension point of the UI of another first bundle using the XML-based UI expansion information (as illustrated in FIG. 4 as "2. UI Injection").

When the service of the first bundle is performed, the OSGi open platform may perform a function added to the first bundle based on the newly expanded UI (as illustrated in FIG. 4 as "3. Data Interaction"). When a user requests the added function in the first bundle, the function is implemented by a service engine included in the second bundle (as illustrated in FIG. 4 as "4. Apply Changed Result).

FIG. 5 is a view illustrating an operation of a new bundle having the UI expansion information.

Referring to FIG. 5, the OSGi open platform (XOAH platform—Extensible Oriented Architecture for Home) according to the exemplary embodiments of the present general inventive concept may perform parsing of information for the UI XML file that may exist in each OSGi presentation layer (e.g., the presentation layers of Bundle A and Bundle B illustrated in FIG. 5), and may manage the UI window according to information for the UI XML file so that the UI can be expanded by the other bundles (e.g., bundles A and B illustrated in FIG. 5, and/or the connection of bundles 165-1, 165-2, and 165-3 illustrated in FIG. 3).

To perform the UI expansion, an extension point of a plurality of regions of the UI window provided by the preinstalled bundle can be defined in the preinstalled bundle and the new bundle can include expansion position information, type information, and action information.

The expansion position information can be position information for a region in which UI expansion is to be performed among an extension point of the first bundle. That is, the expansion position information can be information for a region in which injection is to be performed among points in which the injection is permitted by the other bundles. The extension point may be a Toolbox region, a Detailed View Tap region, and a Menu region of the UI window provided by the preinstalled bundle. The expansion position information may be represented by an XML as illustrated in the region 1110 of FIG. 11. The expansion position information can be a key value and may have a unique value. If the same value is existent, the OSGi open platform may output a message of the same value exception in runtime and identify the problem (e.g., identify which values are the same).

The action information can be information for a display method of the execution result of service provided by the second bundle. That is, the action information can be information about content in which the UI may perform in an extension point when a specific action is generated. For example, the action information can include declaration information to a display a file and/or selection options in the UI or in a pop-up window according to the action information (e.g., where the action information is generated according to a user selection). When the extension point is, for example, a Toolbox point, the action information may include path information of a pop-up when the user clicks the corresponding Toolbox point. The action information may be represented in an XML as illustrated in a region 1130 of FIG. 11. For example, a value "/fileStorage.cm.presentation/client/FileStorage_MyFunction.swf" in the region 1130 can be declaration information to display the file "FileStorage_MyFunction.swf" in the pop-up type when the user makes an action (e.g., makes a selection).

The type information can be information about the UI to receive an execution command for a service provided by the second bundle (i.e., the new bundle). That is, the type information can be information to define whether to further expand the expanded UI with text and/or icons when the expanded UI is displayed on a screen. The type information may be represented in an XML as illustrated in a region 1120 of FIG. 11. For example, a value "<xoa-s-remoteui:displayNameKey>File Storage</xoa-s-remoteui:displayNameKey> <xoa-s-remoteui:resourceMenuRule>3</xoa-s-remoteui:resourceMenuRule>" in the region 1120 can be information for a title of the UI region. A value "<xoa-s-remoteui:toolTipKey>filestorage.detail.resource.toolBox. myfunction. tooltip.key</xoa-s-remoteui:toolTipKey>" can be information for a shape of an icon when displayed in tool-tip window. A value "<xoa-s-remoteui:imageUri>/ filestorage.cm.presentation/static-client/assets/icons/toolbox/myFunction_plan.png</xoa-s-remoteui:imageUri>" can be information for a shape of an icon to be displayed on the expanded UI screen. A value "<xoa-s-remoteui: length>0</xoa-s-remoteui:length> <xoa-s-remoteui: width>90</xoa-s-remoteui:width>" can be information for a size of the pop-up window when the execution result is displayed in the pop-up window. That is, the type information may be used to provide additional text and/or icons in the expanded UI.

FIGS. 6 to 10 are views illustrating examples of a UI window which can be provided by the image forming apparatus 100 of FIG. 1 that provides an OSGi-based service according to exemplary embodiments of the present general inventive concept.

Figure 6:
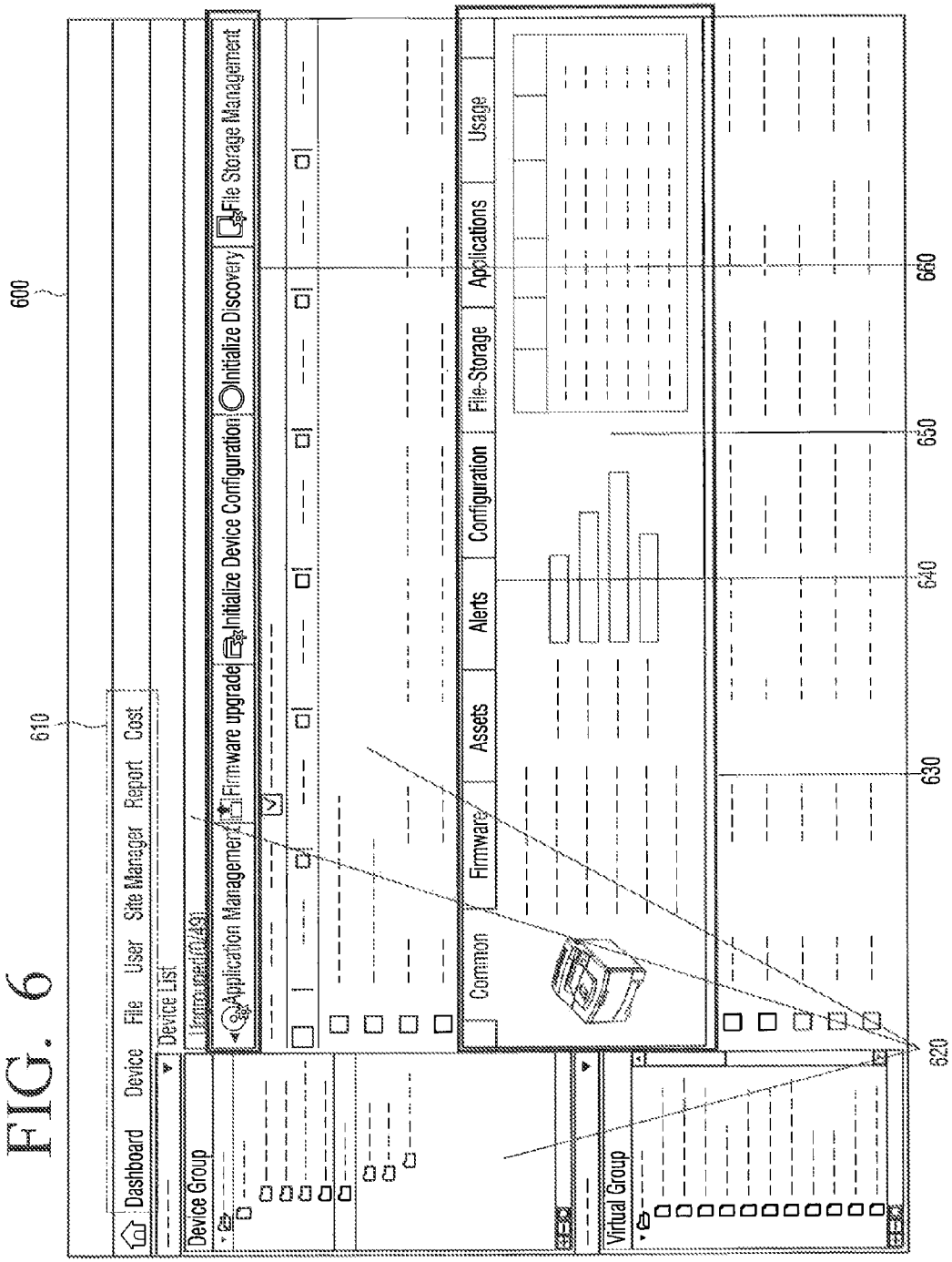
FIGS. 6 to 10 are views illustrating examples of a user interface (UI) window provided by the image forming apparatus of FIG. 1 that provides an OSGI-based service according to exemplary embodiments of the present general inventive concept.

Specifically, FIG. 6 is a view illustrating an example of the UI window of the preinstalled bundle on the image forming apparatus 100 according to exemplary embodiments of the present general inventive concept.

Referring to FIG. 6, the UI window 600 provided by the preinstalled bundle may include a Menus region 610, a Views region 620, a Pop-Up Detail View Container region 630, a Pop-Up Menu Bar region 640, a Pop-Up Detail View region 650, and a Toolbox region 660.

The preinstalled bundle may set at least one region of the plurality of regions described above as an extension point. For example, at least one of the Menus region 610, the Views region 620, the Pop-Up Detail View Container region 630, and the Toolbox region 660 may be set as the extension point. That is, the preinstalled bundle may set one or more regions as an extension point in the UI window 600 so as to add text and/or icons related to services provided by the preinstalled bundle and/or other bundles to the UI window 600.

Figure 7:
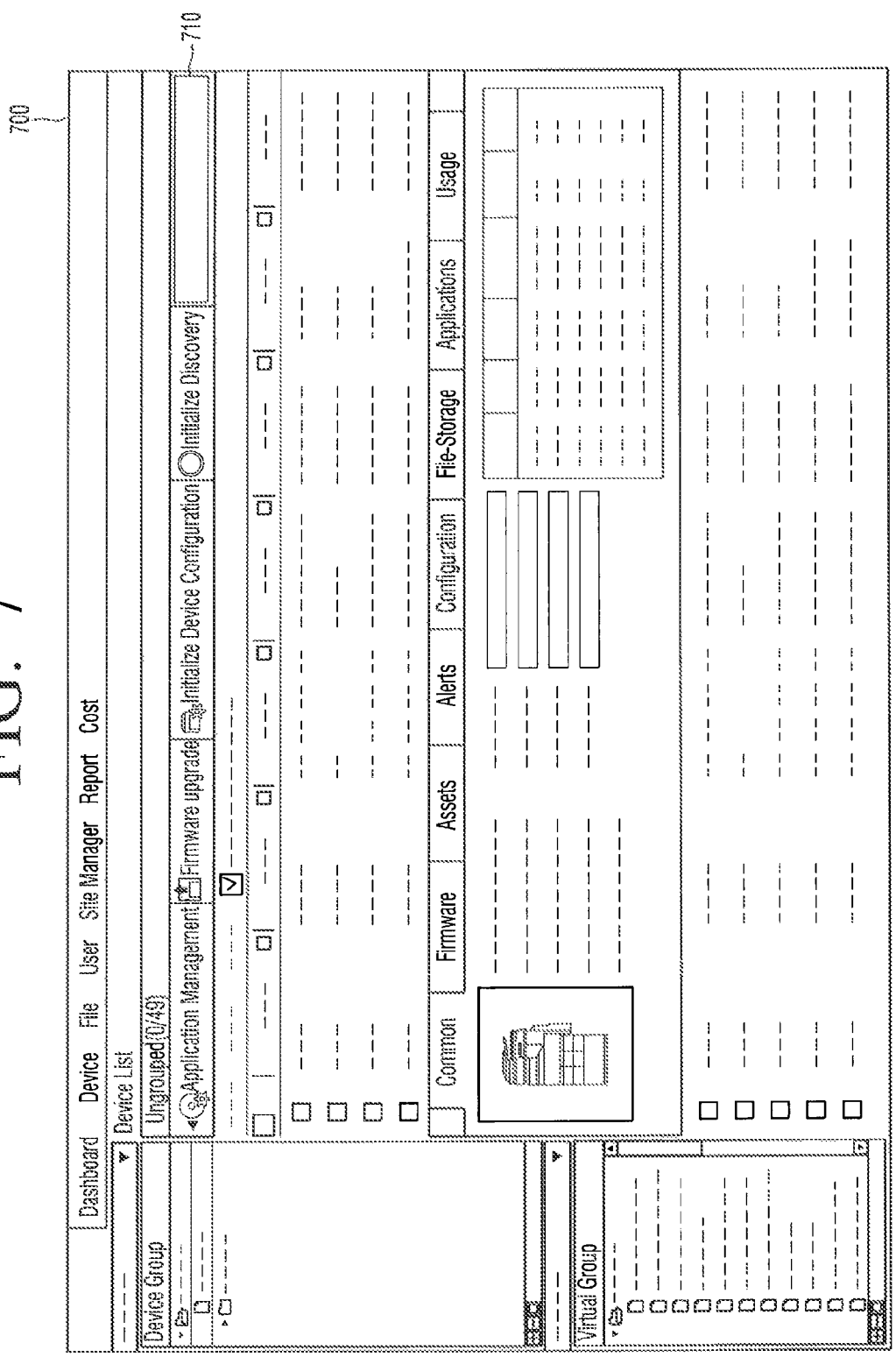
Figure 8:
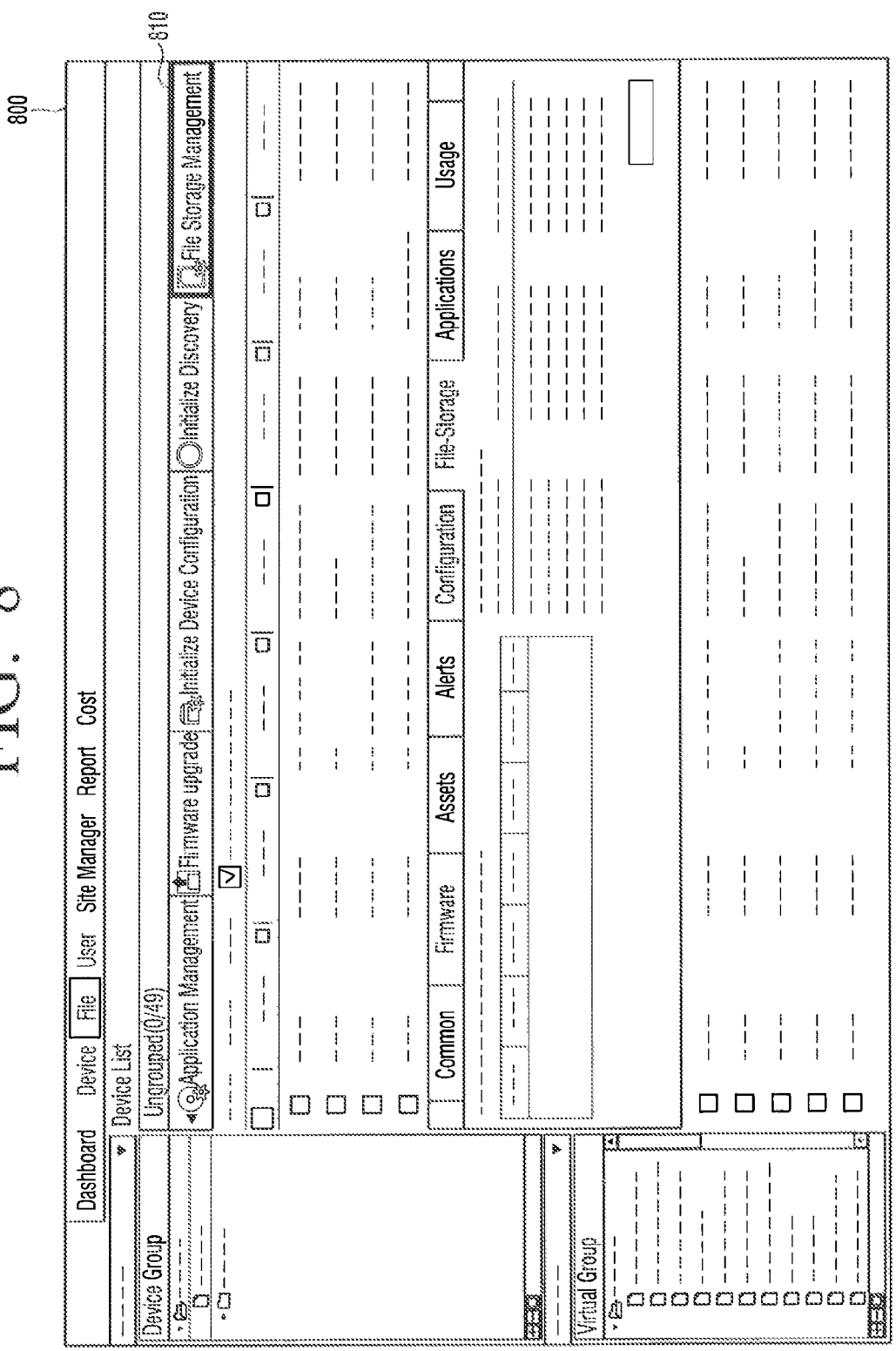

FIG. 7 is an example of a UI window 700 provided by the first bundle and FIG. 8 is an example of a UI window 800 in which the UI is expanded by the UI expansion information according to exemplary embodiments of the present general inventive concept.

Figure 9:
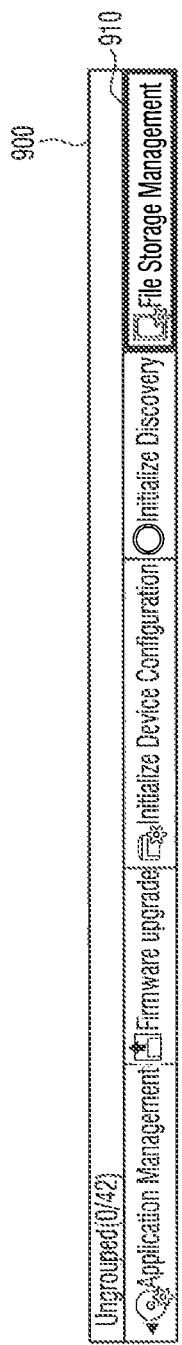

Comparatively referring to FIGS. 7 and 8, a region 710 of FIG. 7 can include an extension point in the UI window provided by the first bundle. When the second bundle having the UI expansion information for the first bundle is installed, a UI 810 corresponding to the UI expansion information can be displayed in the corresponding extension point 710. That is, region 710 illustrated in FIG. 7 can include the UI expansion information can be displayed in this region as illustrated in UI 810. For example, FIG. 8 illustrates that a "File Storage Management" UI 810 is displayed in the extension point of FIG. 7 (i.e., region 710). FIG. 9 illustrates the Toolbox region 900 that includes UI 910 (i.e., "File Storage Management") displayed in FIG. 8 as UI 810 according to exemplary embodiments of the present general inventive concept.

Figure 10:
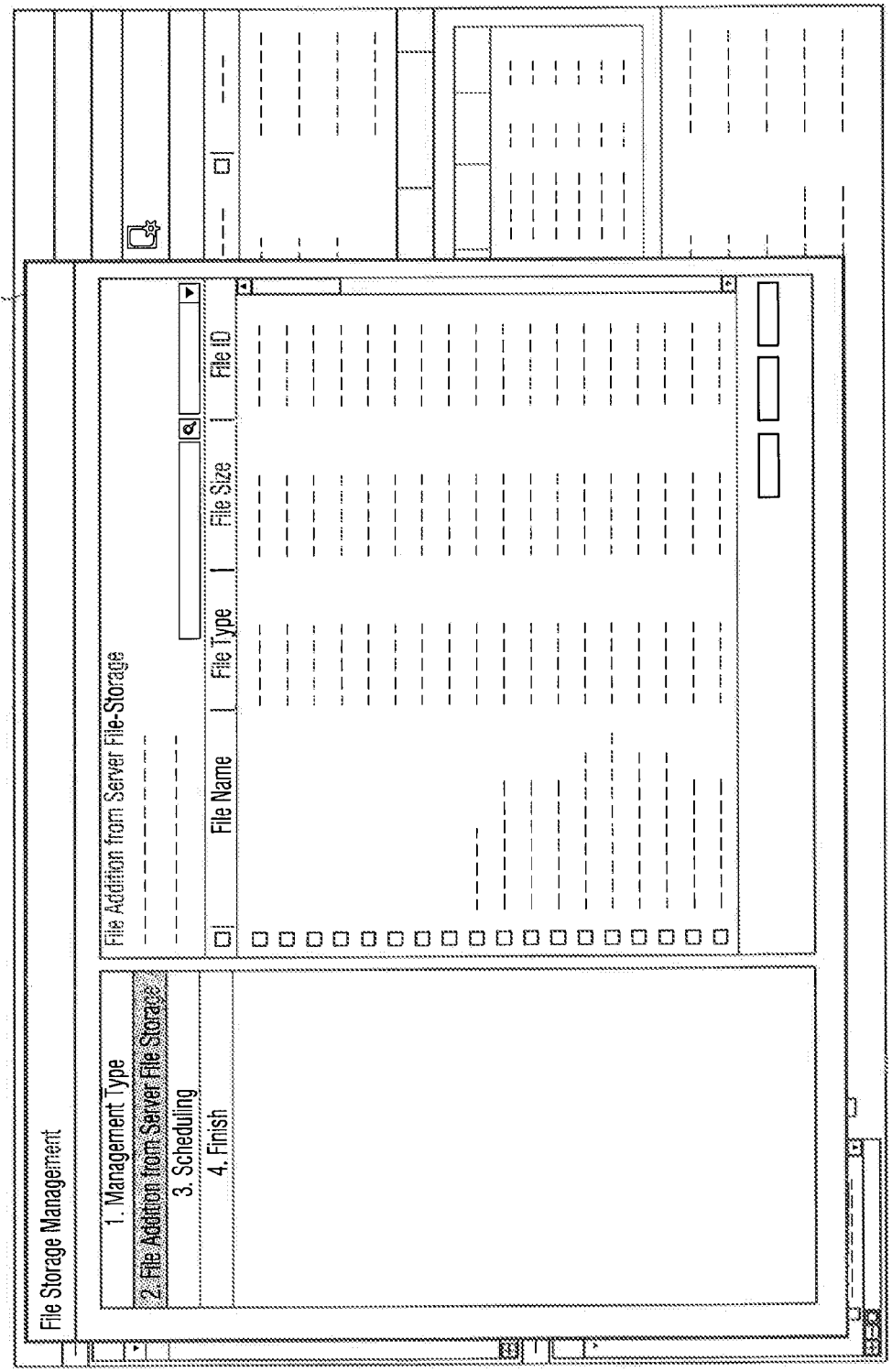

FIG. 10 is an example of a UI window to be displayed when a user selects the UI expansion region according to exemplary embodiments of the present general inventive concept.

Referring to FIG. 10, an execution result by the service engine of the second bundle can be displayed in a pop-up window type 1010. The service engine of the second bundle may operate based on information on the UI window 800 of FIG. 8. Specifically, the expanded UI region may perform the service based on user's selection of the UI window provided by the first bundle and information described by the user in that the expanded UI region can be displayed in an icon type. The result may be displayed in a pop-up window type 1010 as illustrated in FIG. 10, or in one side of the UI window provided by the first bundle.

FIG. 11 is a view illustrating an example of a file configuration of the UI expansion information 1100 according to exemplary embodiments of the present general inventive concept.

FIG. 11 illustrates that the UI expansion information 1100 is described in an XML. The UI expansion information 1100 may include expansion position information 1110, type information 1120, and action information 1130.

The expansion position information 1100 can be position information for a region in which UI expansion is to be performed at an extension point of the first bundle. For example, FIG. 11 illustrates that "fileStorge.toolbox.BillingPlan" can be set as the extension point.

The action information 1130 can be information to display an execution result of service provided by the second bundle. FIG. 11 illustrates that the file "/fileStorage.cm.presentation/ client/FileStorage_MyFunction.swf" can be set to be displayed in a pop-up type window (e.g., the pop-up window type 1010 illustrated in FIG. 10).

The type information 1120 can be information for the UI which receives an execution command for at least one service provided by the second bundle. FIG. 11 illustrates that a title of the UI region is set as "File Storage" (i.e., "<!--Toolbox for File Storage-->") and the display icon is set as a file "myFunction_plan.png".

FIG. 12 is a flowchart illustrating a method of installing a service in an OSGi framework according to exemplary embodiments of the present general inventive concept.

Referring to FIG. 12, a new bundle to be installed in an OSGi framework can be selected at operation S1210. Specifically, a user can select at least one of a plurality of bundles stored in the external server 10 to be a new bundle that is installed in the OSGi framework of the image forming apparatus 100, or to select a new bundle which is to be installed in the OSGi framework among new bundles received and stored in the image forming apparatus 100.

It is determined whether or not the new bundle includes the UI expansion information for the bundle preinstalled in the OSGi framework at operation S1220. Specifically, it may be determined whether or not to include the UI expansion information by checking whether or not the UI expansion information 1100 as illustrated in FIG. 11 is present in the new bundle corresponding to a bundle installation command.

When the new bundle includes the UI expansion information, the UI expansion information is set to the OSGi framework at operation S1230. By the setting as described above, when there is a service execution command for the first bundle, the UI corresponding to the UI expansion information together with the UI expansion information may be displayed in one region of the UI window provided by the first bundle when the service for the first bundle is executed. That is, the UI expansion for the preinstalled bundle (the first bundle) may be performed.

The new bundle can be installed in the OSGi framework on the image forming apparatus at operation S1240.

The method according to exemplary embodiments of the present general inventive concept can install the new bundle having the UI expansion information so that the function expansion and UI expansion for the preinstalled bundle can be performed. The method of installing a service as illustrated in FIG. 12 may be executed in the image forming apparatus 100 illustrated FIG. 2 or any other image forming apparatuses according to exemplary embodiments of the present general inventive concept.

Figure 13:
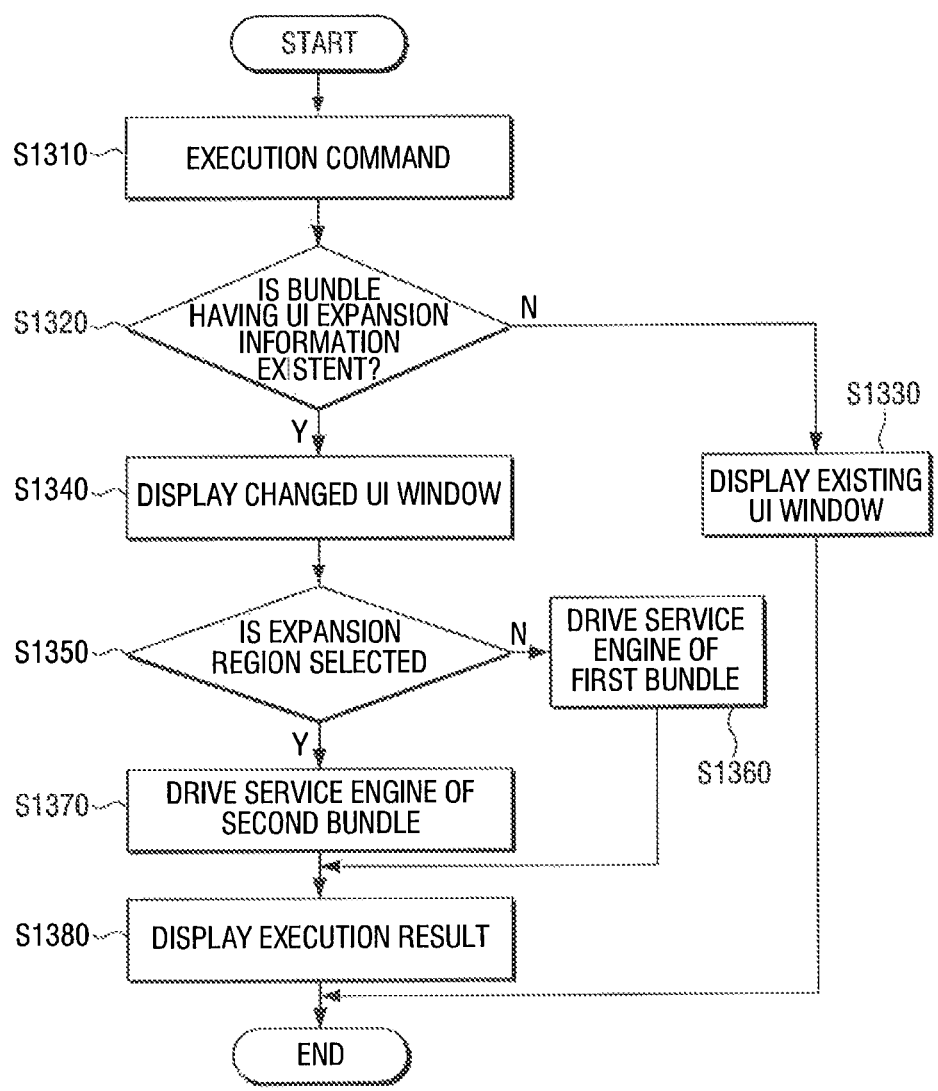
FIG. 13 is a flowchart illustrating a method of providing a service in an OSGi framework according to exemplary embodiments of the present general inventive concept.

FIG. 13 is a flowchart illustrating a method of providing a service in an OSGi framework according to an exemplary embodiments of the present general inventive concept.

Referring to FIG. 13, a service execution command can be input from a user at operation S1310. Specifically, a list of services corresponding to a bundle installed in the OSGi framework of the image forming apparatus can be displayed to the user, and one of the services may be selected to input the service execution command. The service execution command may be received from an external device (for example, the server 10 illustrated in FIG. 1).

It is determined whether or not the second bundle having the UI expansion information for the first bundle corresponding to user's service execution command is existent (i.e., whether the user's service command has been received) at operation S1320. Specifically, it may be determined whether or not the second bundle is existent (e.g., installed in the image forming apparatus) using the UI expansion information installed in the OSGi framework.

When the second bundle having the UI expansion information for the first bundle is not existent at operation S1320-N, a UI window provided by the first bundle is displayed at operation S1330. That is, an existing UI window may be provided to a user. The UI window may be displayed in the UI unit 120 of the image forming apparatus 100 or in an external device (for example, the server 10 illustrated in FIG. 1).

When the second bundle having the UI expansion information for the first bundle is existent at operation S1320-Y, a UI according to the UI expansion information is displayed in one region of the UI window corresponding to the first bundle at operation S1340. That is, a changed UI window in which the UI window provided by the first bundle is expanded may be displayed. The UI window may be in the UI unit 120 of the image forming apparatus 100 or in an external device (for example, the server 10 illustrated in FIG. 1).

When the user selects a service execution region other than the UI expansion region, the service engine of the first bundle can be driven at operation S1360. Specifically, the normal service provided by the first bundle may be performed.

When the user selects the UI expansion region at operation S1350-Y, the service engine of the second bundle can be driven at operation S1370. The service engine of the second bundle may perform the service using the information included in the UI window of the first bundle.

An execution result of the service engine can be displayed at operation S1380. Specifically, the execution result of the service engine of the first bundle and the execution result of the service engine of the second bundle may be displayed. The execution result may be displayed in the UI unit 120 of the image forming apparatus 100 or an external device (for example, a server 10 illustrated in FIG. 1).

Therefore, the method of performing service according to the exemplary embodiments of the present general inventive concept can provide an expansion function by providing the UI window expanded based on the UI expansion information registered in the OSGi framework. The method of executing service as illustrated in FIG. 13 may be executed in the image forming apparatus illustrated in FIG. 2 and described above, or image forming apparatuses having the other configurations.

The method of installing service as described above may be implanted by at least one execution program for executing the method of installing service and the method of executing service as described above and the execution program may be stored in a computer-readable recording medium.

Each block of the exemplary embodiment may be performed as a computer-recordable code on the computer-readable recording medium. The computer-readable recording medium may be a device which can store data readable by a computer system.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image forming apparatus to provide an open services gateway initiative (OSGi)-based service, the image forming apparatus comprising:
   a user interface (UI) device to receive a service execution command for a first bundle to provide at least one service; and
   a control device to control the UI device to display a user interface (UI) window corresponding to the first bundle with a UI corresponding to a UI expansion information of a second bundle in one region of the UI window, when the second bundle having the UI expansion information for the first bundle is installed in the OSGi-based service,
   wherein the first bundle is preinstalled,
   wherein the second bundle provides at least expansion information to extend functionality of the user interface, and
   wherein the one region of the UI window corresponding to the first bundle is an extension point which is preinstalled among a plurality of regions of the UI window displayed in to provide the at least one service of the first bundle.

2. The image forming apparatus as claimed in claim 1, wherein when the UI of the second bundle is selected, the control device controls a service engine of the second bundle according to information included in the UI window corresponding to the first bundle, and controls the UI device to display an execution result of the service engine of the second bundle.

3. The image forming apparatus as claimed in claim 1, wherein the extension point is at least one of a Toolbox region, a Derailed View Tap region, and a Menu region.

4. The image forming apparatus as claimed in claim 1, wherein the UI expansion information includes at least one of type information for a UI to receive an execution command for the at least one service provided by the second bundle, expansion position information in which the UI is to be displayed among the extension point of the first bundle, and action information to display an execution result of the at least one service provided by the second bundle.

5. The image forming apparatus as claimed in claim 4, wherein the UI expansion information is subscribed in an extensible markup language (XML).

6. The image forming apparatus as claimed in claim 3, wherein the control device controls the UI device to expand and display a UI region corresponding to the second bundle in a region corresponding to position information of the UI window, while displaying the UI window for the first bundle.

7. The image forming apparatus as claimed in claim 2, wherein the UI device displays the execution result as a pop-up window.

8. An image forming apparatus to provide an open services gateway initiative (OSGi)-based service, the image forming apparatus comprising:
 a user interface (UI) device to display the OSGi-based service; and
 a control device to control the UI device to display a UI window including a first UI which displays a first service provided by a first bundle, a second UI which displays a second service provided by a second bundle installed after the first bundle is installed, and an expansion UI which displays the second service provided by the second bundle on the first UI after the second bundle is installed,
 wherein the first bundle is preinstalled,
 wherein the second bundle provides at least expansion information to extend functionality of the first UI through the expansion user, and
 wherein one region of the UI window corresponding to the first bundle is an extension point which is preinstalled among a plurality of regions of the UI window displayed in to provide the at least one service of the first bundle.

9. A method of installing an open services gateway initiative (OSGi)-based service on an OSGi apparatus, the method comprising:
 selecting a new bundle to provide at least one service to be installed on an OSGi framework of the OSGi apparatus;
 determining whether the new bundle includes UI expansion information for at least one bundle preinstalled on the OSGi framework;
 when the new bundle includes the UI expansion information, setting the UI expansion information to the OSGi framework so as to display a UI according to the UI expansion information in one region of a UI window corresponding to the preinstalled bundle when at least one service corresponding to the preinstalled bundle is executed; and
 installing the new bundle in the OSGi framework of the OSGi apparatus,
 wherein the new bundle provides at least expansion information to extend functionality of the UI through the expansion user interface, and
 wherein the one region of the UI window corresponding to the preinstalled bundle is an extension point which is preinstalled among a plurality of regions of the UI window displayed in to provide the at least one service of the preinstalled bundle.

10. The method as claimed in claim 9, wherein in the preinstalled bundle, a UI extension point is set among a plurality of regions of the UI window displayed when the service is executed.

11. The method as claimed in claim 10, wherein the extension point is at least one of a Toolbox region, a Derailed View Tap region, and a Menu region.

12. The method as claimed in claim 9, wherein the UI expansion information includes at least one of type information for a UI to receive an execution command for services provided by the new bundle, expansion position information in which the UI is to be displayed among the extension point of the preinstalled bundle, and action information to display an execution result of the at least one service provided by the new bundle.

13. The method as claimed in claim 12, wherein the UI expansion information is subscribed in an extensible markup language (XML).

14. The method as claimed in claim 9, wherein the new bundle provides the at least one service using information included in the UI window provided by the preinstalled bundle.

15. A method of providing open services gateway initiative (OSGi)-based service with an OSGi-based apparatus, the method comprising:
 receiving a service execution command for a first bundle that provides at least one service with the OSGi-based apparatus; and
 displaying a user interface (UI) window corresponding to the first bundle with a UI corresponding to a UI expansion information of a second bundle in one region of the UI window, when the second bundle having the UI expansion information for the first bundle is installed in the OSGi-based service,
 wherein the first bundle is preinstalled, and
 wherein the second bundle provides at least UI expansion information to extend functionality of the UI window, and
 wherein the one region of the UI window corresponding to the first bundle is an extension point preinstalled among a plurality of regions of the UI window displayed when the at least one service of the first bundle is provided.

16. The method as claimed in claim 15, further comprising:
 selecting the UI of the second bundle;
 controlling a service engine of the second bundle with the OSGi-based apparatus according to information included the UI window corresponding to the first bundle; and
 displaying an execution result of the service engine of the second bundle in the UI window corresponding to the first bundle.

17. The method as claimed in claim 15, wherein the extension point is at least one of a Toolbox region, a Derailed View Tap region, and a Menu region.

18. The method as claimed in claim 15, wherein the UI expansion information includes at least one of type information for a UI to receive an execution command for services provided by a new bundle, expansion position information in which the UI is to be displayed among the extension point of a preinstalled bundle, and action information to display an execution result of services provided by the new bundle.

19. The method as claimed in claim 18, wherein the UI expansion information is subscribed in an extensible markup language (XML).

20. The method as claimed in claim 16, wherein the displaying the execution result includes expanding and displaying a UI region corresponding to the second bundle in a region corresponding to position information of the UI window, while displaying the UI window for the first bundle.

21. The method as claimed in claim 16, wherein the displaying the execution result includes displaying the execution result in a pop-up window.

22. A non-transitory computer-readable recording medium including a program that, when executed by a computer, performs a method of providing an open services gateway initiative (OSGi)-based service, the method comprising:
  receiving a service execution command for a first bundle that provides at least one service;
  determining whether a second bundle having user interface (UI) expansion information for the first bundle is present; and
  displaying a user interface (UI) window corresponding to the first bundle with a UI according to the UI expansion information in one region of the UI window corresponding to the first bundle,
  wherein the first bundle is preinstalled,
  wherein the second bundle provides at least UI expansion information to extend functionality of the UI window, and
  wherein the one region of the UI window corresponding to the first bundle is an extension point preinstalled among a plurality of regions of the UI window displayed when the at least one service of the first bundle is provided.

23. The computer-readable recoding medium as claimed in claim 22, further comprising:
  selecting a UI of the second bundle;
  controlling a service engine of the second bundle based on information included the UI window corresponding to the first bundle; and
  displaying an execution result of the service engine of the second bundle in the UI window corresponding to the first bundle.

24. A method of expanding a user interface (UI) of an open services gateway initiative (OSGi)-based service apparatus including an OSGi framework, the method comprising:
  receiving a bundle to provide at least one service, the bundle including UI expansion information to extend functionality of the UI through the expansion user interface;
  setting the UI expansion information to the OSGi framework of the OSGi-based service apparatus; and
  displaying the UI of the OSGi-based service apparatus including the expansion information when a service execution command is received by the OSGi-based service apparatus for the at least one service provided by the bundle including the UI expansion information,
  wherein the setting the UI expansion information comprises:
  expanding the UI of the OSGi-based service apparatus at a predetermined extension point in at least one region of the UI to include the at least one service of the received bundle, and
  wherein one region of the UI window corresponding to a preinstalled bundle is an extension point which is preinstalled among a plurality of regions of the UI window displayed in to provide the at least one service of the preinstalled bundle.

25. The method of claim 24, further comprising:
  displaying an execution result the UI of the OSGi-based service apparatus of the received service execution command.

26. The method of claim 24, wherein the predetermined extension point is one of a plurality of regions of the UI.

27. The method of claim 24, wherein the UI expansion information includes at least one of type information for a UI to receive the service execution command, expansion position information in which the UI is to be displayed among the extension point, and action information to display an execution result of the at least one service provided by the bundle.

* * * * *